United States Patent
Sakaguchi

(10) Patent No.: US 8,826,732 B2
(45) Date of Patent: Sep. 9, 2014

(54) CYCLICALLY LIQUID FEEDING APPARATUS

(75) Inventor: Tetsuo Sakaguchi, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 356 days.

(21) Appl. No.: 13/435,120

(22) Filed: Mar. 30, 2012

(65) Prior Publication Data

US 2012/0255352 A1   Oct. 11, 2012

(30) Foreign Application Priority Data

Apr. 6, 2011   (JP) .................................. 2011-084748

(51) Int. Cl.
*G01F 23/00*   (2006.01)
*G05D 23/13*   (2006.01)
*G05D 9/12*   (2006.01)

(52) U.S. Cl.
CPC .............. *G05D 9/12* (2013.01); *G05D 23/1393* (2013.01)
USPC .......................................... 73/302; 165/301

(58) Field of Classification Search
CPC ....... G05D 23/00; G05D 23/12; G05D 23/13; G05D 23/1393; G05D 23/1306; G05D 23/132
USPC ........ 73/302, 290 R; 137/341, 606, 340, 334, 137/337; 165/301, 302; 62/185, 188; 236/12.1, 34.5
See application file for complete search history.

(56) References Cited

U.S. PATENT DOCUMENTS

| | | | |
|---|---|---|---|
| 3,788,090 A * | 1/1974 | Richards | .......................... 62/139 |
| 4,242,569 A * | 12/1980 | Kayser | .......................... 392/358 |
| 7,073,342 B2 | 7/2006 | Sakaguchi et al. | |
| 2008/0289811 A1 | 11/2008 | Kariya | |

FOREIGN PATENT DOCUMENTS

| | | |
|---|---|---|
| JP | 2008-292026 | 12/2008 |
| JP | 2009-287865 | 12/2009 |
| JP | 2009-293867 | 12/2009 |

\* cited by examiner

*Primary Examiner* — Hezron E Williams
*Assistant Examiner* — Marrit Eyassu
(74) *Attorney, Agent, or Firm* — Oblon, Spivak, McClelland, Maier & Neustadt, L.L.P.

(57) ABSTRACT

An outer tank and an inner tank having liquid at different temperatures, and a load are connected to each other via outer and inner tank liquid circulating channels and a valve unit. A first opening-and-closing valve is connected to a first bypass flow-channel connecting an outer tank feed channel and an inner tank feedback channel, a second opening-and-closing valve is connected to a second bypass flow channel connecting an inner tank feed channel and an outer tank feedback channel to detect the liquid level of the liquid in the outer tank and the liquid level of the liquid in the inner tank by a liquid level sensor. The liquid levels are adjusted by selectively opening the first opening-and-closing valve and the second opening-and-closing valve when the liquid levels in both tanks become uneven in the process of cyclically feeding the liquid from the tanks to the load.

12 Claims, 2 Drawing Sheets

CYCLICALLY LIQUID FEEDING APPARATUS

BACKGROUND OF THE INVENTION

[1] Field of the Invention

The present invention relates to a cyclically liquid feeding apparatus configured to feed liquid for cooling circularly to a load and to cool the load and, more specifically, to a cyclically liquid feeding apparatus configured to cool the load using two types of liquid having different liquid temperatures.

[2] Description of the Related Art

For example, in various manufacturing apparatuses such as semiconductor manufacturing apparatuses and liquid crystal manufacturing apparatuses, in order to cool the apparatuses (load) which generates heat and maintain the temperature constant, liquid for cooling is cyclically fed from the cyclically liquid feeding apparatus and cool the load. In this case, as disclosed in Patent Documents, Japanese Unexamined Patent Application Publication Nos. 2009-293867, 2009-287865, and 2008-292026, in order to control the temperature according to the calorific power of the load with a high degree of accuracy, preparing two types of liquid having different liquid temperatures and selectively feeding liquid having a liquid temperature suitable for cooling the load by mixing means including a plurality of three-way valves or the like, or feeding the same to the load in a state in which the liquid is brought into a liquid temperature suitable for cooling the load by mixing the two-types of liquid is also performed.

In examples disclosed in Patent Documents JP2009-293867A and JP2009-287865A described above, a heat source tank (high-temperature tank) storing high-temperature liquid therein, a cold source tank (low-temperature tank) storing a low-temperature liquid therein, and mixing means including a plurality of three-way valves or the like are provided, and liquid in the heat source tank or the cold source tank is fed to the load by a suitable amount using the mixing means. In the example in the related art disclosed in Patent Document JP2008-292026A, almost the same operations are performed.

However, in the related art, since the high-temperature tank and the low-temperature tank are installed at different positions separated from each other, the structure is complicated and cost is increased because not only the two tanks occupy a wide space of installation and hence the size of the apparatus is increased, but also heat-insulating processes such as condensation prevention or heat-radiation prevention should be worked respectively on each tank.

Also, when feeding the liquid to the load from the two tanks, the liquid moves between the two tanks in association with a switching operation of the mixing means, so that the liquid levels of the liquid in the two tanks vary significantly and hence becomes unbalanced, which may cause a trouble in temperature adjustment of the liquid in each of the tanks. Therefore, in Patent Document JP2008-292026A, a reserve tank is provided to absorb an increase and a decrease of the liquid in the cooling-side (low-temperature) tank and the heating-side (high-temperature) tank. However, the space for installing the reserve tank is additionally increased and, in addition, when liquid which is not controlled in temperature from the reserve tank flowed into the cooling-side tank and the heating-side tank, the temperature adjustment of liquid in the both tanks becomes further difficult.

SUMMARY OF INVENTION

It is an object of the present invention to provide a cyclically liquid feeding apparatus configured to cool a load using two types of liquid having different liquid temperatures, in which a liquid level change in association with a movement of liquid between two tanks including the liquid stored therein is absorbed to facilitate a temperature adjustment of liquid in respective tanks and allow installation of the apparatus compactly at low cost.

In order to achieve the above-described object, a cyclically liquid feeding apparatus according to the present invention is a cyclically liquid feeding apparatus including: an outer tank storing a first liquid adjusted to a required temperature; an inner tank installed in the interior of the outer tank so as to be located above the first liquid and configured to store a second liquid adjusted to a temperature different from that of the first liquid; a valve unit configured to feed the first liquid and the second liquid to a load solely or in mixture; an outer tank liquid circulating channel including an outer tank feed channel configured to feed the first liquid in the interior of the outer tank to the valve unit and an outer tank return channel configured to return the liquid from the valve unit into the outer tank; an inner tank liquid circulating channel including an inner tank feed channel configured to feed the second liquid in the interior of the inner tank to the valve unit and an inner tank return channel configured to return the liquid from the valve unit into the inner tank; a first opening-and-closing valve configured to open and close a first bypass flow channel which connects the outer tank feed channel and the inner tank return channel; a second opening-and-closing valve configured to open and close a second bypass flow channel which connects the inner tank feed channel and the outer tank return channel; and liquid level sensor means provided respectively on the outer tank and the inner tank and configured to selectively open the first opening-and-closing valve and the second opening-and-closing valve to adjust the liquid levels when the liquid levels of the first liquid and the second liquid are uneven between the two tanks.

In a configuration of the present invention, the liquid level sensor means includes an outer tank lower limit liquid level sensor configured to detect the fact that the liquid level of the first liquid in the outer tank reaches a lower limit liquid level which is a lower limit for a stable operation, and an inner tank lower limit liquid level sensor configured to detect the fact that the liquid level of the second liquid in the inner tank reaches a lower limit liquid level which is a lower limit for a stable operation, and the outer tank lower limit liquid level sensor opens the second opening-and-closing valves and the inner tank lower limit liquid level sensor opens the first opening-and-closing valve.

Also, in another configuration of the present invention, the liquid level sensor means includes an outer tank upper limit liquid level sensor configured to detect the fact that the liquid level of the first liquid in the outer tank reaches an upper limit liquid level which is an upper limit for a stable operation, and an inner tank upper limit liquid level sensor configured to detect the fact that the liquid level of the second liquid in the inner tank reaches an upper limit liquid level which is an upper limit for a stable operation, and the outer tank upper limit liquid level sensor opens the first opening-and-closing valves and the inner tank upper limit liquid level sensor opens the second opening-and-closing valve.

Also, in the present invention, the inner tank includes a liquid level adjusting hole at a position corresponding to a normal liquid level which is a liquid level of the second liquid at the time of the normal operation, and may be configured to allow part of the second liquid by an amount corresponding to the risen level from the normal liquid level to flow from the liquid level adjusting hole into the outer tank to maintain the normal liquid level, or may be configured to have an overflow port which allows the second liquid to overflow therefrom when the liquid level of the second liquid exceeds the upper limit liquid level.

In the present invention, preferably, the outer tank has a capacity which can collect and store liquid in the outer tank liquid circulating channel, the inner tank liquid circulating channel, the valve unit, and the load at the time of termination of the operation of the apparatus, and the inner tank is arranged at a position which does not come into contact with the first liquid even when the liquid level of the first liquid in the outer tank rises to the upper limit liquid level during the operation of the apparatus.

The present invention may include a third opening-and-closing valve configured to open and close a third bypass flow channel connecting the outer tank feed channel and the inner tank return channel, and the flow channel cross-sectional area of the third opening-and-closing valve is larger than the flow channel cross-sectional area of the first opening-and-closing valve.

According to the present invention, with the provision of the inner tank having the second liquid stored therein in the interior of the outer tank having the first liquid stored herein, a compact and less expensive configuration of the apparatus is achieved in comparison with the related art in which the both tanks are installed at different locations. Also, the change in liquid level caused by the movement of the liquid between the two tanks is absorbed by the first opening-and-closing valve and the second opening-and-closing valve, so that the abrupt and significant liquid level change in the respective tanks can be prevented and hence the temperature adjustment of the liquid can be facilitated.

DESCRIPTION OF THE PREFERRED EMBODIMENT

Figure 1:
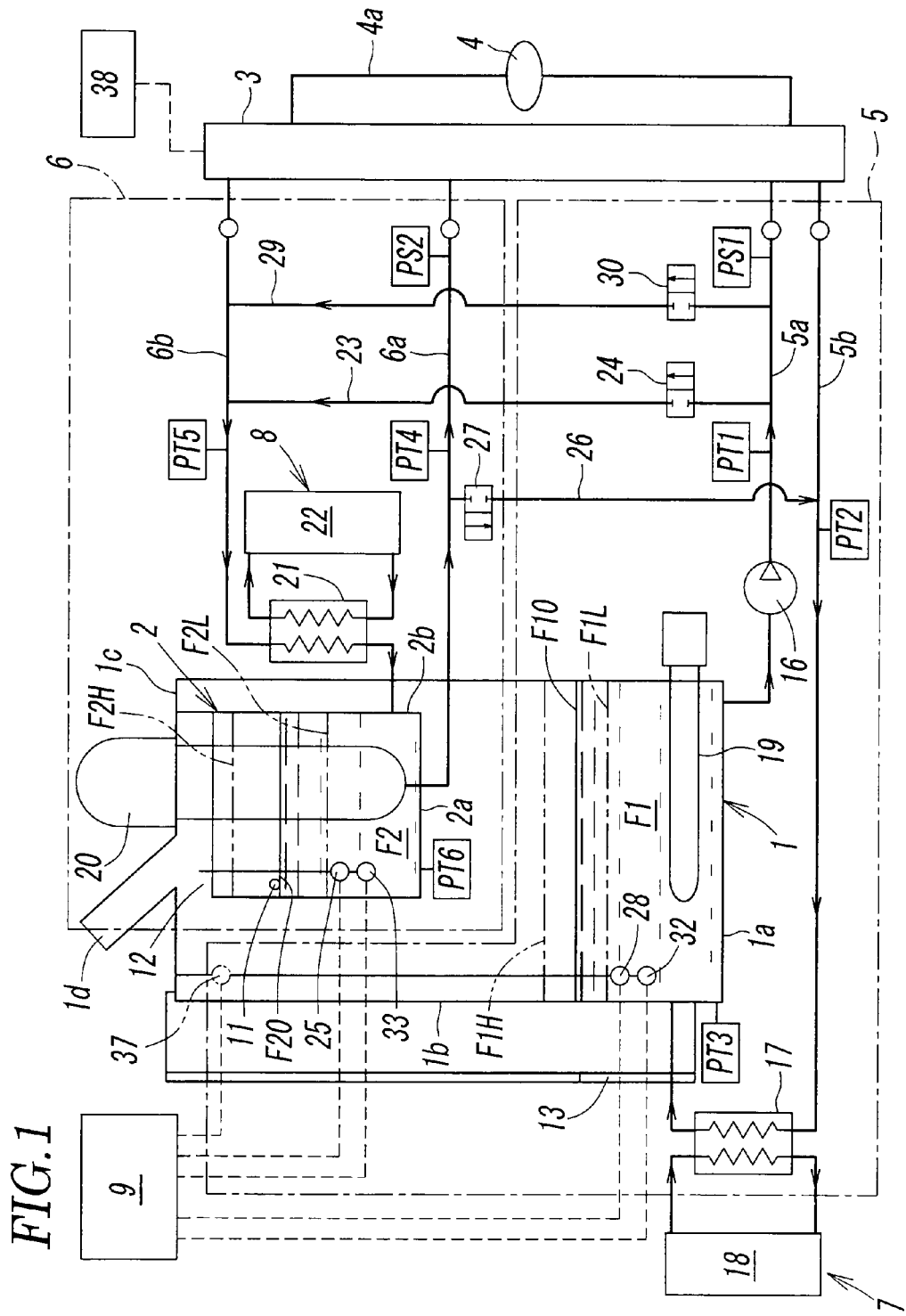
FIG. 1 is a configuration drawing of a cyclically liquid feeding apparatus according to a first embodiment of the present invention.

FIG. 1 is a configuration drawing of a cyclically liquid feeding apparatus according to a first embodiment of the present invention. The cyclically liquid feeding apparatus includes a large-capacity outer tank 1 including a first liquid F1 stored therein, a small-capacity inner tank 2 installed in the interior of the outer tank 1 and including a second liquid F2 having a temperature different from that of the first liquid F1 stored therein, a valve unit 3 configured to feed the first liquid F1 and a second liquid F2 solely or in mixture to a load 4, an outer tank liquid circulating channel 5 configured to feed the first liquid F1 in the outer tank 1 cyclically to the valve unit 3, an inner tank liquid circulating channel 6 configured to feed the second liquid F2 in the inner tank 2 cyclically to the valve unit 3, a first temperature adjusting apparatus 7 configured to adjust the temperature of the first liquid F1 to a required temperature, a second temperature adjusting apparatus 8 configured to adjust the second liquid F2 to a required temperature, and a control unit 9 configured to control the entire apparatus according to a set program.

In this embodiment, the temperature of the first liquid F1 is set to be higher than the temperature of the second liquid F2 such that, for example, the temperature of the first liquid F1 is 50° C. and the temperature of the second liquid F2 is −15° C.

Since the first liquid F1 and the second liquid F2 are only different in temperature but are the same liquid, the first liquid F1 and the second liquid F2 are referred to simply as "liquid" or "liquid F" when the discrimination of both of them is not required in the following description.

The outer tank 1 is surrounded by a bottom wall 1a and a side wall 1b and an upper wall 1c entire over the outer surface thereof and the upper wall 1c is formed with a liquid feed port 1d, so that when the liquid F is stored in the outer tank 1 and in the inner tank 2 prior to the usage of the apparatus, the liquid F can be fed from the liquid feed port 1d toward the inner tank 2 from above. The fed liquid F overflows from a liquid level adjusting hole 11 and an overflow port 12 described later of the inner tank 2 and flows into the outer tank 1 as well, whereby a required amount of the liquid F is stored in the both tanks 1, 2. A required heat-insulating process is applied to the outer surface of the outer tank 1.

Reference numeral 13 in the drawing indicates a liquid-level meter configured to allow monitoring of the liquid level of the first liquid F1 in the outer tank 1 from the outside.

Also, the inner tank 2 includes a bottom wall 2a and a side wall 2b and is opened on a top surface thereof, is mounted on a lower surface of the upper wall 1c of the outer tank 1 in a state of keeping a distance with respect to the upper wall 1c, so that the inner tank 2 is installed so as to be located in a space portion above the liquid surface of the first liquid F1 entirely. Then, the overflow port 12 is formed between an upper end of the side wall 2b of the inner tank and the lower surface of the upper wall 1c of the outer tank 1.

The overflow port 12 is configured to prevent damage of the inner tank 2 when the liquid level of the second liquid F2 in the inner tank 2 rises abnormally and exceeds an upper limit liquid level F2H, which is a rising limit at the time of the normal operation by causing the liquid by an amount corresponding to the risen part thereof to overflow. Therefore, the overflow port 12 is formed at a position above the upper limit liquid level F2H, and the opening surface area is enough to cause the liquid by an amount corresponding to the abnormally risen part to overflow with high reliability.

In contrast, the liquid level adjusting hole 11 is formed as one or a plurality of holes at positions lower than the overflow port 12 of the side wall 2b, and is formed to be smaller in opening surface area than that of the overflow port 12. In other words, the liquid level adjusting hole 11 is formed at a position corresponding to a normal liquid level F20, which is a liquid level of the second liquid F2 at the time of normal operation of the apparatus. When the liquid level of the second liquid F2 is fluctuated during the operation and rises from the normal liquid level F20, the liquid F by an amount corresponding to the risen part is caused to overflow and be flowed into the outer tank 1, thereby maintaining the normal liquid level F20. Therefore, the opening surface area of the liquid level adjusting hole 11 is formed to have a size which may cause the second liquid F2 to overflow by a flowing amount which does not affect the temperature adjustment of the first liquid F1 in the outer tank 1.

When the liquid level of the second liquid F2 in the inner tank 2 is at the normal liquid level F20, the liquid level of the first liquid F1 in the outer tank 1 also becomes a normal liquid level F10.

In this manner, by installing the inner tank 2 having the second liquid F2 at a low temperature stored therein in the interior of the outer tank 1, the necessity of a process for preventing condensation or heat insulation to be performed on the outer surface of the bottom wall 2a and the outer surface of the side wall 2b of the inner tank 2 is eliminated and, even the process is to be performed, only a simple process is sufficient and hence cost is reduced. Also, since the space for installation can be reduced in comparison with the case of installing the two tanks 1, 2 at different positions, the apparatus can be formed compactly.

The outer tank liquid circulating channel 5 includes an outer tank feed channel 5a connected to the outer tank 1 and configured to feed the first liquid F1 to the valve unit 3 by a first pump 16, and an outer tank return channel 5b configured to return the liquid F from the valve unit 3 into the outer tank 1. A heat exchanger 17 is connected to a midpoint of the return channel 5b, and the liquid F in the return channel 5b is adjusted to a required temperature and is flowed into the outer tank 1 by heat exchange performed between the liquid in the return channel 5b and coolant (cooling water) from a cooling circuit 18 in the heat exchanger 17. At this time, when the temperature of the first liquid F1 in the outer tank 1 is lowered to a level lower than the set temperature, the liquid temperature may be increased by a heater 19 provided in the outer tank 1 or at a suitable position in the flow channel, and the first temperature adjusting apparatus 7 can be formed by the heat exchanger 17 and the cooling circuit 18 and the heater 19.

The heat exchanger 17 may be installed in the outer tank 1, whereby the heat-insulating process of the heat exchanger 17 is facilitated and in addition, even when the liquid is leaked from the heat exchanger 17, the leaked liquid can be received by the outer tank 1, so that a high degree of safety is ensured.

Depending on the set temperature of the first liquid F1, only one of the heat exchanger 17 and the heater 19 may be installed while omitting the other one of those. In this case, the first temperature adjusting apparatus 7 is formed only of the heat exchanger 17 or only of the heater 19.

The temperature adjustment of the first liquid F1 is performed by measuring the liquid temperature using temperature sensors installed at one position or a plurality of positions of the outer tank 1, the outer tank feed channel 5a, the outer tank return channel 5b, and the load 4 and controlling the first temperature adjusting apparatus 7 by the control unit 9 on the basis of the result of measurement.

In the drawing, reference symbol PT1 designates a temperature sensor connected to the feed channel 5a, PS1 designates a pressure sensor also connected to the feed channel 5a, PT2 designates a temperature sensor connected to the return channel 5b, and PT3 designates a temperature sensor connected to the outer tank 1, and respective sensors are connected to the control unit 9. However, the illustration of the connected state is omitted. In addition, although instruments such as a flow meter are connected to the feed channel 5a and the return channel 5b at required positions, the illustration thereof is also omitted.

The inner tank liquid circulating channel 6 includes a second pump 20 mounted on the upper wall 1c of the outer tank 1 and immersed in the inner tank 2, an inner tank feed channel 6a connected to the second pump 20 and configured to feed the second liquid F2 in the inner tank 2 to the valve unit 3, and an inner tank feedback channel 6b configured to return the liquid from the valve unit 3 into the inner tank 2. A heat exchanger 21 is connected to a midpoint of the return channel 6b, and the liquid in the return channel 6b is adjusted to a required temperature and is flowed into the inner tank 2 by heat exchange performed between the liquid in the return channel 6b and coolant from a cooling circuit 22 in the heat exchanger 21. The second temperature adjusting apparatus 8 is formed by the heat exchanger 21 and the cooling circuit 22.

The second pump 20 may be installed at the midpoint of the inner tank feed channel 6a in the same manner as the first pump 16 instead of the immersion type.

For reference, when the temperature of the second liquid F2 in the inner tank 2 is lowered too much to a lever lower than the set temperature, the liquid temperature may be increased by a heater provided in the inner tank 2 or at a suitable position of the flow channel.

Also, the heat exchanger 21 may be installed in the outer tank 1, whereby the heat-insulating process of the heat exchanger 21 is facilitated and in addition, even when the liquid is leaked from the heat exchanger 21, the leaked liquid can be received by the outer tank 1, so that a high degree of safety is ensured.

The temperature adjustment of the second liquid F2 is performed by measuring the liquid temperature using temperature sensors installed at one position or a plurality of positions of the inner tank 2, the inner tank feed channel 6a, the inner tank return channel 6b, and the load 4 and controlling the second temperature adjusting apparatus 8 by the control unit 9 on the basis of the result of measurement.

In the drawing, reference symbol PT4 designates a temperature sensor connected to the feed channel 6a, PS1 designates a pressure sensor also connected to the inner tank feed channel 6a, PT5 designates a temperature sensor connected to the return channel 6b and PT6 designates a temperature sensor connected to the inner tank 2, and respective sensors are connected to the control unit 9. However, the illustration of the connected state is omitted. In addition, although instruments such as a flow meter are connected to the feed channel 6a and the return channel 6b at required positions, the illustration thereof is also omitted.

The outer tank feed channel 5a of the outer tank liquid circulating channel 5 and the inner tank return channel 6b of the inner tank liquid circulating channel 6 are connected to each other by a first bypass flow channel 23, and a first opening-and-closing valve 24 including a two-port valve is connected to the first bypass flow channel 23 so as to be controlled to be opened and closed by the control unit 9. The first opening-and-closing valve 24 is opened upon reception of a detection signal generated when a lower limit liquid level sensor 25 installed in the interior of the inner tank 2 detects the lowering of the liquid level of the second liquid F2, and replenishes part of the liquid F in the outer tank feed channel 5a toward the inner tank return channel 6b.

Also, the inner tank feed channel 6a of the inner tank liquid circulating channel 6 and the outer tank feedback channel 5b of the outer tank liquid circulating channel 5 are connected to each other by a second bypass flow channel 26, and a second opening-and-closing valve 27 including a two-port valve is connected to the second bypass flow channel 26 so as to be controlled to be opened and closed by the control unit 9. The second opening-and-closing valve 27 is opened upon reception of a detection signal generated when a lower limit liquid level sensor 28 installed in the interior of the outer tank 1 detects the lowering of the liquid level of the first liquid F1, and replenishes part of the liquid F in the inner tank feed channel 6a toward the outer tank return channel 5b.

Furthermore, the outer tank feed channel 5a and the inner tank return channel 6b are connected to each other by a third bypass flow channel 29, and a third opening-and-closing valve 30 including a two-port valve is connected to the third bypass flow channel 29 so as to be controlled to be opened and closed by the control unit 9. The third opening-and-closing valve 30 is configured to be opened and closed by a switching operation or an operation signal such as electricity, air from the outside at the time of maintenance of the apparatus, and is configured to replenish part of the liquid F in the outer tank feed channel 5a toward the inner tank return channel 6b for raising the temperature of the second liquid F2 in the inner tank 2 to a temperature on the order of the normal temperature.

Therefore, the flow channel cross-sectional areas of the first opening-and-closing valve 24 and the second opening-and-closing valve 27 are formed to be sufficiently smaller than the flow channel cross-sectional areas of the outer tank and inner tank feed channels 5a, 6a and the return channels 5b, 6b, so that a small flowing amount of liquid is replenished from the outer tank feed channel 5a to the inner tank return channel 6b or from the inner tank feed channel 6a to the outer tank return channel 5b, whereby the temperature adjustments of the liquid in the outer tank 1 and the inner tank 2 are prevented from being affected significantly thereby.

In contrast, the third opening-and-closing valve 30 is formed to have a larger cross-sectional area of the flow channel than the first opening-and-closing valve 24 and the second opening-and-closing valve 27 so that the temperature of the second liquid F2 in the inner tank 2 can be increased quickly, and a large flowing amount of liquid is allowed to flow therethrough.

The third opening-and-closing valve 30 may be connected to the first bypass flow channel 23 in parallel with the first opening-and-closing valve 24. In this case, the first bypass flow channel 23 also serves as the third bypass flow channel 29.

As the first to third opening-and-closing valves 24, 27, 30, opening-and-closing valves which can be opened and closed by arbitrary methods such as a solenoid operating system, a pilot operating system, or an electric operation system, and the like may be employed.

The lower limit liquid level sensor 28 detects the fact that the liquid level of the first liquid F1 is lowered and reaches a lower limit liquid level F1L which is a lower limit at the time of operation, and outputs a detection signal, and an emergency liquid level sensor 32 detects the fact that the liquid level of the first liquid F1 is lowered abnormally beyond the lower limit liquid level F1L and outputs a detection signal. The sensors are provided in the interior of the outer tank 1 and are connected respectively to the control unit 9.

Then, the second opening-and-closing valve 27 is opened by the control unit 9 in response to the detection signal from the lower limit liquid level sensor 28, and liquid in the inner tank feed channel 6a is replenished to the outer tank feedback channel 5b, whereby the liquid level in the outer tank 1 rises. Also, when the detection signal is output from the emergency liquid level sensor 32, the alarm is issued, and the first pump 16 is stopped, or the first and second pumps 16, 20 are stopped.

In contrast, the lower limit liquid level sensor 25 detects the fact that the liquid level of the second liquid F2 is lowered and reaches a lower limit liquid level F2L, and outputs the a detection signal, and an emergency liquid level sensor 33 detects the fact that the liquid level of the second liquid F2 is lowered abnormally beyond the lower limit liquid level F2L and outputs a detection signal. The sensors are provided in the interior of the inner tank 2 and are connected respectively to the control unit 9.

Then, the first opening-and-closing valve 24 is opened in response to the detection signal from the lower limit liquid level sensor 25, and liquid in the outer tank feed channel 5a is fed to the inner tank return channel 6b, whereby the liquid level in the inner tank 2 rises. Also, when the detection signal is output from the emergency liquid level sensor 33, the alarm is issued, and the second pump 20 is stopped, or the first and second pumps 16, 20 are stopped.

Subsequently, the operation of the cyclically liquid feeding apparatus having the configuration as described above will be described.

During the operation of the apparatus, both of the first pump 16 and the second pump 20 are driven, the first liquid F1 in the outer tank 1 and the second liquid F2 in the inner tank 2 are fed to the valve unit 3 while circulating in the outer tank liquid circulating channel 5 and the inner tank liquid circulating channel 6, so that liquid adjusted to a temperature suitable for cooling the load 4 is selectively fed to the load 4 via an outer piping 4a by a switching operation of the valve unit by the control unit 9, or the liquid adjusted to a temperature suitable of cooling the load 4 is fed to the load 4 through the outer piping 4a by mixing the first liquid F1 and the second liquid F2 by suitable amounts. The valve unit 3 may be switched by a separate control unit 38 which controls the load 4.

Then, in association with the switching operation of the valve unit 3, the liquid moves between the outer tank 1 and the inner tank 2 via the valve unit 3, and the liquid level varies in the both tanks 1, 2.

Now, in FIG. 1, assuming that the liquid level of the first liquid F1 in the outer tank 1 is lowered from the normal liquid level F10 indicated by a solid line, the liquid level of the second liquid F2 in the inner tank 2 rises correspondingly.

Then, under the circumstance in which the liquid level in the outer tank 1 is not lowered to the lower limit liquid level F1L, the second liquid F2 of an amount corresponding to the risen level thereof flows into the outer tank 1 from the liquid level adjusting hole 11 and hence the variations in liquid level are absorbed in the inner tank 2, whereby the liquid levels in the both tanks 1, 2 are restored to the normal liquid levels F10 and F20.

At this time, in the outer tank 1, the temperature of the first liquid F1 tends to be slightly lowered due to the inflow of the second liquid F2 at a low temperature. However, since an inflow amount is small, the temperature adjustment by the first temperature adjusting apparatus 7 is not significantly affected, and the set temperature is immediately restored.

In contrast, when the liquid level in the outer tank 1 is lowered to the lower limit liquid level F1L, the lower limit liquid level sensor 28 in the outer tank 1 is activated, and outputs a detection signal to open the second opening-and-closing valve 27, and hence part of the liquid in the inner tank feed channel 6a flows into the outer tank return channel 5b through the second bypass flow channel 26, and the outer tank 1 is replenished therewith. At this time, when the liquid level in the inner tank 2 rises to a level higher than the normal liquid level F20, an overflow from the liquid level adjusting hole 11 is also performed.

The second opening-and-closing valve 27 is closed after a certain period of time has elapsed after the liquid level in the outer tank 1 has restored and the lower limit liquid level sensor 28 has turned OFF or after the second opening-and-closing valve 27 has opened, and the replenishment of the liquid from the second bypass flow channel 26 is stopped. However, since the inflow of the second liquid F2 from the liquid level adjusting hole 11 into the outer tank 1 is continuously performed, the liquid level of the liquid in the both tanks 1, 2 is resorted to the normal liquid levels F10 and F20.

In this case as well, since a flowing amount of the second liquid F2 at a low temperature flowing into the outer tank 1 is small, the temperature adjustment of the first liquid F1 in the outer tank 1 is not significantly affected.

When the liquid level of the first liquid F1 is abnormally lowered beyond the lower limit liquid level F1L, the emergency liquid level sensor 32 detects that event and outputs a detection signal, then, the alarm is issued, and the first pump 16 is stopped, or the first and second pumps 16, 20 are stopped.

At this time, when the liquid level of the second liquid F2 exceeds the upper limit liquid level F2H, and reaches the position of the overflow port 12 in the inner tank 2, the liquid overflows from the overflow port 12 and the inner tank 2 is prevented from becoming damaged.

Subsequently, when the liquid level of the first liquid F1 in the outer tank 1 rises from the position of the normal liquid level F10 indicated by a solid line, the liquid level of the second liquid F2 in the inner tank 2 is lowered correspondingly.

Then, when the liquid level of the second liquid F2 in the inner tank 2 is lowered to the lower limit liquid level F2L, the liquid level of the first liquid F1 in the outer tank 1 rises to the position of an upper limit liquid level F1H. However, the lower limit liquid level sensor 25 installed in the inner tank 2 is activated and outputs a detection signal to open the first opening-and-closing valve 24, and hence part of the liquid flowing in the outer tank feed channel 5a flows into the inner tank return channel 6b through the first bypass flow channel 23, and the inner tank 2 is replenished therewith.

The first opening-and-closing valve 24 is closed after a certain period of time has elapsed after the liquid level in the inner tank 2 has restored and the lower limit liquid level sensor 25 has turned OFF or after the first opening-and-closing valve 24 has opened, and the replenishment of the liquid from the first bypass flow channel 23 is stopped.

At this time, in the inner tank 2, the temperature of the second liquid F2 tends to be slightly increased due to the inflow of the first liquid F1 at a high temperature. However, since an inflow amount is small, the temperature adjustment by the second temperature adjusting apparatus 8 is not significantly affected, and the set temperature is immediately restored.

Also, when the liquid level of the second liquid F2 is abnormally lowered beyond the lower limit liquid level F2L, the emergency liquid level sensor 33 detects that event and outputs a detection signal, then, the alarm is issued, and the second pump 20 is stopped, or the first and second pumps 16, 20 are stopped.

In this case, even when the pumps 16, 20 are stopped, the liquid may return back into the inner tank 2 depending on the switched state of the valve unit 3, and when the liquid level in the inner tank 2 rises thereby, the liquid is overflowed from the liquid level adjusting hole 11 or the overflow port 12, thereby preventing the inner tank 2 from becoming damaged.

In a stage where the first opening-and-closing valve 24 is closed and the replenishment of the liquid from the first bypass flow channel 23 is stopped, the liquid level of the liquid in the both tanks 1, 2 may not reach the normal liquid levels F10, F20. However, it is within a range in which the normal operation can be performed, and hence the operation of the apparatus is not affected. However, it is also possible to detect whether or not the liquid in at least one of the tanks is in the normal liquid level with another liquid level sensor, and close the first opening-and-closing valve 24 when the liquid level is restored to a normal liquid level. The same applies to the second opening-and-closing valve 27.

When the operation of the apparatus is terminated, the liquid F in circulation is entirely collected. At this time, the liquid in circulation in the valve unit 3 and the load 4 through the inner tank liquid circulating channel 6 flows back into the inner tank 2, and is overflowed from the liquid level adjusting hole 11 and the overflow port 12 and flowed into the outer tank 1. In contrast, the liquid in circulation in the valve unit 3 and the load 4 through the outer tank liquid circulating channel 5 flows back into to directly into the outer tank 1.

Therefore, the capacity of the outer tank 1 is formed to have a size which can store the liquid F from the outer tank liquid circulating channel 5, the inner tank liquid circulating channel 6, the valve unit 3, and the load 4 into the outer tank 1. In this case, the liquid in the outer tank 1 and the inner tank 2 do not necessarily have to be kept in a non-contact state after the collection of the liquid, and hence part or the entire part of the inner tank 2 (to the position of the overflow port 12) may be immersed into the liquid. In essence, the capacity of the outer tank 1 may be the size which prevents the liquid from leaking out to the outside after the collection of the liquid.

However, the inner tank 2 is preferably arranged at a position which does not come into contact with the first liquid F1 even when the liquid level of the first liquid F1 in the outer tank 1 rises to a position of the upper limit liquid level F1H during the operation of the apparatus.

When the maintenance of the apparatus is performed, the temperatures of the liquid F1 in the outer tank 1 and the liquid F2 in the inner tank 2 need to be averaged. Therefore, when a large flowing amount of the third opening-and-closing valve 30 is opened by a switching operation or an operation signal such as electricity, air from the outside, the inner tank feedback channel 6b is replenished with the liquid in the outer tank feed channel 5a and the liquid flows into the inner tank 2, and the temperature of the second liquid F2 in the inner tank 2 rises. Simultaneously, the liquid F2 in the inner tank 2 overflows from the liquid level adjusting hole 11 and the overflow port 12 and flows into the outer tank 1, the temperature of the liquid F1 in the outer tank 1 is lowered, and the temperature of the liquid in the both tanks 1, 2 is averaged.

At this time, instead of the third opening-and-closing valve 30, or in addition to the third opening-and-closing valve 30, an overflow tube which directly connects the inner tank 2 and the outer tank 1 may be provided to open and close the overflow tube with a large flowing amount of the opening-and-closing valve.

Figure 2:
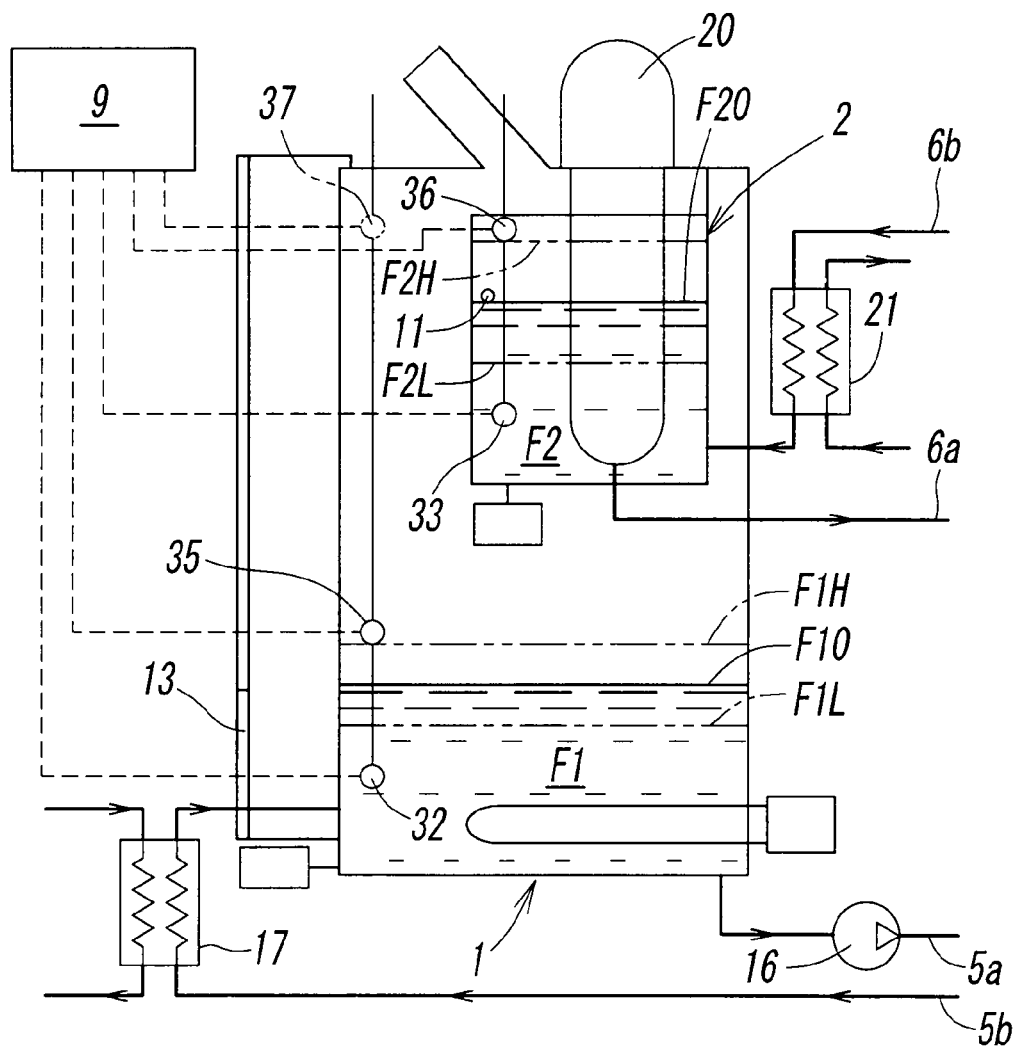
FIG. 2 is a configuration drawing of a principal portion of the cyclically liquid feeding apparatus according to a second embodiment of the present invention.

In the first embodiment, the fact that the liquid level of the liquid in the outer tank 1 and the inner tank 2 is detected by the lower limit liquid level sensors 25 and 28, whereby the first and second opening-and-closing valves 24, 27 are opened. However, instead of the lower limit liquid level sensors 25, 28, as in the second embodiment in FIG. 2, a configuration in which the upper limit liquid level sensors 35, 36 are provided in the interior of the outer tank 1 and in the interior of the inner tank 2 respectively, and the fact that the liquid levels of the liquid in the respective tanks 1, 2 have risen to the upper limit liquid levels F1H, F2H is detected by the sensors 35, 36, thereby opening the first and second opening-and-closing valves 24, 27 is also applicable.

In this case, the first opening-and-closing valve 24 is opened by the operation of the upper limit liquid level sensor 35 in the outer tank 1, and part of the liquid flowing in the outer tank feed channel 5a flows into the inner tank return channel 6b through the first bypass flow channel 23, so that the inner tank 2 is replenished therewith. Also, the second opening-and-closing valve 27 is opened by the operation of the upper limit liquid level sensor 36 in the inner tank 2 and part of the liquid of the inner tank feed channel 6a flows into the outer tank return channel 5b through the second bypass flow channel 26, so that the outer tank 1 is replenished therewith.

The configuration and the operation other than those in the second embodiment are the same as those in the first embodiment, the principal same components are designated by the same reference numerals as in the first embodiment and description will be omitted.

In the respective embodiments described above, the liquid level adjusting hole 11 is provided on the inner tank 2, and when the liquid level of the second liquid F2 rises to a level higher than the normal liquid level F20, the liquid levels in the both tanks are maintained at the normal liquid levels F10, F20 by allowing part of the second liquid F2 to flow into the outer tank 1 through the liquid level adjusting hole 11. However, the apparatus can be operated normally as long as the liquid levels of the liquid in the both tanks 1, 2 are between the upper limit liquid levels F1H, F2H and the lower limit liquid levels F1L, F2L, and hence the liquid level adjusting hole 11 is not necessarily required and may be omitted.

Also, in the respective embodiments described above, the temperature of the first liquid F1 in the outer tank 1 is set to be higher than the temperature of the second liquid F2 in the inner tank 2. However, in contrast, the temperature of the first liquid F1 in the outer tank 1 may be set to be lower than the temperature of the second liquid F2 in the inner tank 2.

In addition, as shown by a chain line in FIG. 1, another liquid level sensor 37 which activates an alarm when the outer tank 1 is filled up with the first liquid F1 may be provided as needed.

Also, in the embodiment described above, the liquid level sensor is of a float type and is normally in an OFF state, and is configured to be turned ON when a change of the liquid level is detected and outputs a detection signal. However, in contrast, a configuration in which the liquid level sensor is normally in an ON state and is turned OFF when the change of the liquid level is detected, which serves as a detection signal, is also applicable.

Alternatively, instead of the liquid level sensor of the float type, an optical type liquid level sensor which is configured to detect the liquid surface, that is, the liquid level in an analog or a digital system on the basis of the optical method, or a liquid level sensor configured to detect increase and decrease of liquid present in a tank, that is, rising or lowering of the liquid level by measuring the weight of the liquid in an analog or a digital system in a stepless manner or in a multistep manner is also applicable. In this case, a detection signals from the respective sensors are output to the control unit and, when the predetermined liquid levels are reached, the first and second opening-and-closing valves are controlled to be opened and closed by the control unit.

The invention claimed is:

1. A cyclically liquid feeding apparatus comprising:
   an outer tank storing a first liquid adjusted to a required temperature;
   an inner tank installed in the interior of the outer tank so as to be located above the first liquid and storing a second liquid adjusted to a temperature different from that of the first liquid;
   a valve unit feeding the first liquid and the second liquid to a load solely or in mixture;
   an outer tank liquid circulating channel including an outer tank feed channel feeding the first liquid in the interior of the outer tank to the valve unit and an outer tank return channel returning the liquid from the valve unit into the outer tank;
   an inner tank liquid circulating channel including an inner tank feed channel feeding the second liquid in the interior of the inner tank to the valve unit and an inner tank return channel returning the liquid from the valve unit into the inner tank;
   a first opening-and-closing valve opening and closing a first bypass flow channel which connects the outer tank feed channel and the inner tank return channel;
   a second opening-and-closing valve configured to open and close a second bypass flow channel which connects the inner tank feed channel and the outer tank return channel; and
   liquid level sensor means provided respectively on the outer tank and the inner tank and configured to selectively open the first opening-and-closing valve and the second opening-and-closing valve to adjust the liquid levels when the liquid levels of the first liquid and the second liquid are uneven between the two tanks.

2. The cyclically liquid feeding apparatus according to claim 1, wherein the liquid level sensor means includes an outer tank lower limit liquid level sensor detecting the fact that the liquid level of the first liquid in the outer tank reaches a lower limit liquid level which is a lower limit for a stable operation, and an inner tank lower limit liquid level sensor detecting the fact that the liquid level of the second liquid in the inner tank reaches a lower limit liquid level which is a lower limit for a stable operation, and the outer tank lower limit liquid level sensor opens the second opening-and-closing valve and the inner tank lower limit liquid level sensor opens the first opening-and-closing valve.

3. The cyclically liquid feeding apparatus according to claim 1, wherein the liquid level sensor means includes an outer tank upper limit liquid level sensor detecting the fact that the liquid level of the first liquid in the outer tank reaches an upper limit liquid level which is an upper limit for a stable operation, and an inner tank upper limit liquid level sensor detecting the fact that the liquid level of the second liquid in the inner tank reaches an upper limit liquid level which is an upper limit for a stable operation, and the outer tank upper limit liquid level sensor opens the first opening-and-closing valve and the inner tank upper limit liquid level sensor opens the second opening-and-closing valve.

4. The cyclically liquid feeding apparatus according to claim 1, wherein the inner tank includes a liquid level adjusting hole at a position corresponding to a normal liquid level which is a liquid level of the second liquid at the time of the normal operation, and is configured to allow part of the second liquid by an amount corresponding to the risen level from the normal liquid level to flow from the liquid level adjusting hole into the outer tank to maintain the normal liquid level.

5. The cyclically liquid feeding apparatus according to claim 1, wherein the inner tank includes an overflow port allowing the second liquid to overflow when the liquid level of the second liquid exceeds the upper limit liquid level.

6. The cyclically liquid feeding apparatus according to claim 4, wherein the inner tank includes an overflow port allowing the second liquid to overflow when the liquid level of the second liquid exceeds the upper limit liquid level.

7. The cyclically liquid feeding apparatus according to claim 1, wherein the outer tank has a capacity which can collect and store liquid in the outer tank liquid circulating channel, the inner tank liquid circulating channel, the valve unit, and the load at the time of termination of the operation of the apparatus, and the inner tank is arranged at a position which does not come into contact with the first liquid even when the liquid level of the first liquid in the outer tank rises to the upper limit liquid level during the operation of the apparatus.

8. The cyclically liquid feeding apparatus according to claim 4, wherein the outer tank has a capacity which can collect and store liquid in the outer tank liquid circulating channel, the inner tank liquid circulating channel, the valve unit, and the load at the time of termination of the operation of the apparatus, and the inner tank is arranged at a position which does not come into contact with the first liquid even when the liquid level of the first liquid in the outer tank rises to the upper limit liquid level during the operation of the apparatus.

9. The cyclically liquid feeding apparatus according to claim 5, wherein the outer tank has a capacity which can collect and store liquid in the outer tank liquid circulating channel, the inner tank liquid circulating channel, the valve unit, and the load at the time of termination of the operation of the apparatus, and the inner tank is arranged at a position which does not come into contact with the first liquid even when the liquid level of the first liquid in the outer tank rises to the upper limit liquid level during the operation of the apparatus.

10. The cyclically liquid feeding apparatus according to claim 1, comprising a third opening-and-closing valve opening and closing a third bypass flow channel connecting the outer tank feed channel and the inner tank return channel, and the flow channel cross-sectional area of the third opening-and-closing valve is larger than the flow channel cross-sectional area of the first opening-and-closing valve.

11. The cyclically liquid feeding apparatus according to claim 4, comprising a third opening-and-closing valve opening and closing a third bypass flow channel connecting the outer tank feed channel and the inner tank return channel, and the flow channel cross-sectional area of the third opening-and-closing valve is larger than the flow channel cross-sectional area of the first opening-and-closing valve.

12. The cyclically liquid feeding apparatus according to claim 5, comprising a third opening-and-closing valve opening and closing a third bypass flow channel connecting the outer tank feed channel and the inner tank return channel, and the flow channel cross-sectional area of the third opening-and-closing valve is larger than the flow channel cross-sectional area of the first opening-and-closing valve.

* * * * *